United States Patent [19]
Winkler et al.

[11] 3,741,375
[45] June 26, 1973

[54] MAGAZINE FOR STORAGE OF CASSETTES CONTAINING CONVOLUTED MOTION PICTURE FILM

[75] Inventors: Friedrich Winkler; Johann Zanner, both of Unterhaching, Germany

[73] Assignee: Agfa-Gevaert Aktiengesellschaft, Leverkusen, Germany

[22] Filed: Jan. 19, 1971

[21] Appl. No.: 107,751

[30] Foreign Application Priority Data
Jan. 24, 1970  Germany................... P 70 02 456.5

[52] U.S. Cl.............. 206/1 R, 206/74, 206/DIG. 36, 220/20.6, 312/20
[51] Int. Cl.......................... B65d 5/50, B65d 85/67
[58] Field of Search...................... 206/1 R, DIG. 36, 206/52 F, 73, 74; 220/22.6; 312/20, 10, 71

[56] References Cited
UNITED STATES PATENTS

| | | | |
|---|---|---|---|
| 3,561,004 | 2/1971 | Kouz et al.................... | 206/DIG. 36 |
| 3,220,787 | 11/1965 | Latos.................................... | 312/71 |
| 945,121 | 1/1910 | Flynn.................................... | 217/18 |
| 2,499,623 | 3/1950 | Barnett................................ | 312/20 |
| 3,510,008 | 5/1970 | Mason.................................... | 206/1 |
| 2,949,184 | 8/1960 | Lehner et al...................... | 206/65 K |
| 1,541,173 | 6/1925 | Ormond............................... | 220/22.6 |

Primary Examiner—William T. Dixson, Jr.
Attorney—Michael S. Striker

[57] ABSTRACT

A magazine in the form of an elongated tray has a compartment for reception of a stack of cassettes for storage of convoluted motion picture film. Each cassette has a casing consisting of two mirror symmetrical shells and a circumferential groove in its external surface. One side wall of the magazine constitutes a carrier for a series of elastic positioning elements each of which engages a separate shell in the compartment to prevent stray movements of cassettes while the magazine is moved with reference to a motion picture projector to place a selected cassette into a projection position. The positioning elements resemble disks, rollers, tongues and/or solid or hollow cushions, and the carrier is normally biased to an operative position in which its positioning elements bear against the adjoining shells.

10 Claims, 5 Drawing Figures

PATENTED JUN 26 1973　3,741,375
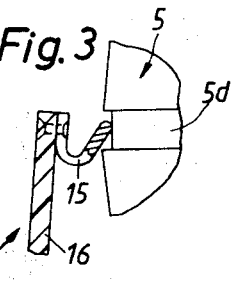
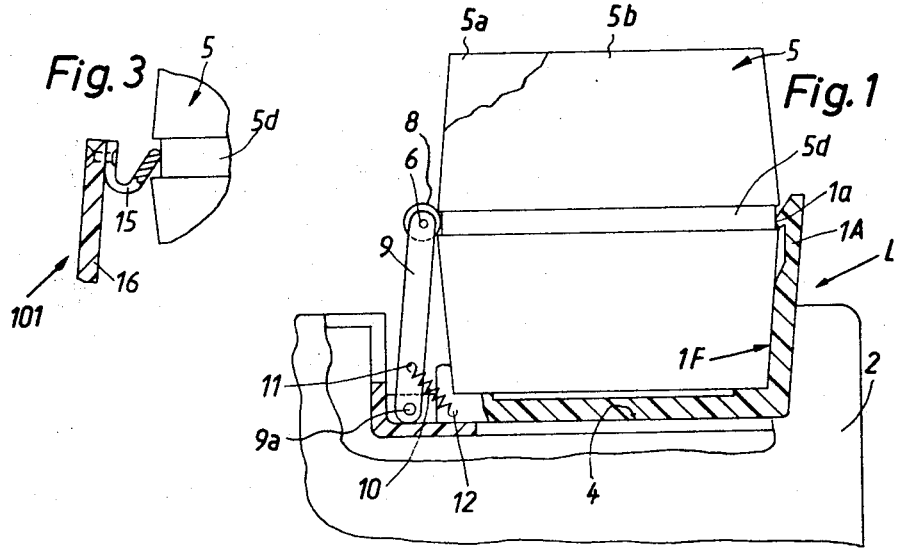
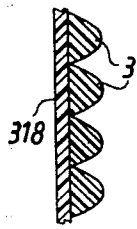
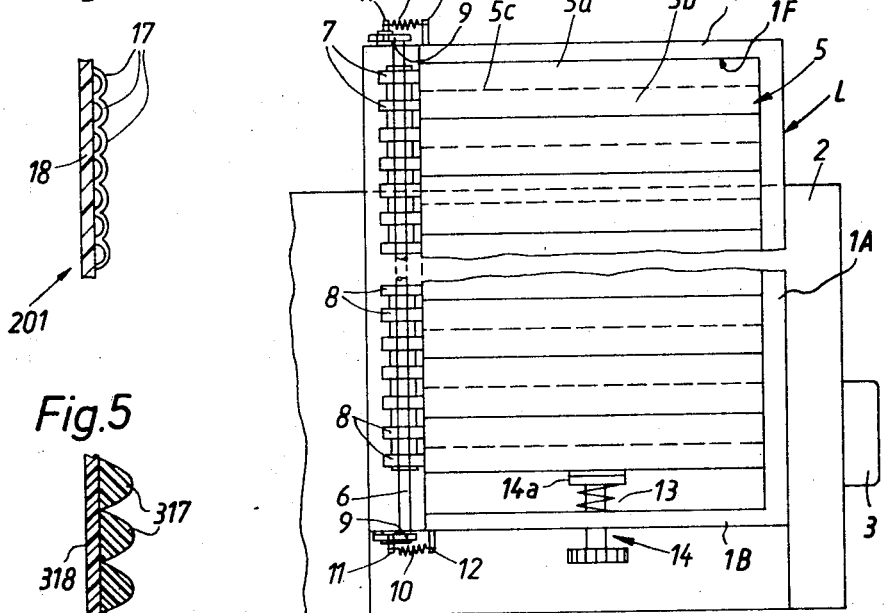
INVENTOR
FRIEDRICH WINKLER
JOHANN ZANNER
BY

MAGAZINE FOR STORAGE OF CASSETTES CONTAINING CONVOLUTED MOTION PICTURE FILM

BACKGROUND OF THE INVENTION

The present invention relates to improvements in containers or magazines for cassettes which contain convoluted motion picture film. More particularly, the invention relates to improvements in magazines which can be used for storage of cassettes containing convoluted motion picture film and can be mounted in or on motion picture projectors to place successive cassettes into an optimum position for withdrawal of film from their interior. Still more particularly, the invention relates to improvements in magazines for storage and transport of cassettes of the type having mass-produced components which are united to confine a supply of convoluted motion picture film.

Cassettes for convoluted motion picture film normally consist of synthetic plastic material and are preferably mass-produced in an injection molding or like machine. Mass-production of parts of cassettes invariably results in deviations of the dimensions of such parts from predetermined optimum dimensions so that the cassettes are not exactly identical with each other. This can cause serious problems when a stack of cassettes must be stored in a magazine which is thereupon inserted into or otherwise mounted on a motion picture projector and is advanced to place successive or selected cassettes into a predetermined projection position in which the film in a cassette occupying such projection position can be automatically withdrawn, threaded through the projector and attached to a takeup reel for projection of the images of its frames onto a screen or the like. Projectors which utilize magazines for stacks of cassettes are desirable when the number of exposures of a particular scene, subject or event is too large to be recorded on a single film and when it is desirable to reduce the length of intervals between the presentations of successive films. Reference may be had to the copending application Ser. No. 99,179 filed Dec. 17, 1970 by Alfred Winkler et al., and to the copending application Ser. No. 99,569 filed Dec. 18, 1970 by Bernhard von Fischern et al., both owned by the assignee of the present case.

SUMMARY OF THE INVENTION

An object of the invention is to provide a novel and improved magazine or tray for storage of preferably mass-produced cassettes for convoluted motion picture film in such a way that the cassettes can be properly positioned in the magazine irrespective of eventual deviations of their dimensions from optimum dimensions.

Another object of the invention is to provide a magazine for the stacking of synthetic plastic cassettes serving for storage of convoluted motion picture film and having pairs of abutting mirror symmetrical shells or halves, and to construct and assemble the magazine in such a way that it can properly engage, hold and locate not only the individual cassettes but also the shells of such cassettes.

A further object of the invention is to provide a magazine which can hold each of a stack or row of cassettes for convoluted motion picture film without wobbling or other stray movements even if the dimensions of cassettes and/or their parts deviate from optimum dimensions.

The improved magazine is designed to accommodate stacks of cassettes of the type serving for storage of convoluted motion picture film and having a casing comprising several main portions which preferably resemble shells and are mirror symmetrical with reference to a central plane which is parallel to and located between the two outer sides of a cassette. The improved magazine preferably resembles an elongated tray and defines a preferably elongated compartment for reception of a stack of cassettes located in planes which are normal to the longitudinal direction of the compartment. In accordance with a feature of the invention, the magazine is provided with locating means including a plurality of discrete or interconnected positioning elements each of which engages a different main portion of a cassette in the compartment. Thus, if the compartment is designed to accommodate a stack consisting of not more than twelve cassettes, the magazine has at least 24 positioning elements each of which engages a main portion in the compartment. This insures that each cassette is held in the compartment against stray movements while the magazine is being moved with reference to the housing of a motion picture projector so as to place successive or selected cassettes into a projection position.

The positioning elements preferably consist at least in part of elastomeric material and may resemble disks, rollers, wheels, flexible tongues or strips, hollow or solid elastic cushions or the like, as long as they are capable of properly but releasably engaging the adjoining main portions. The positioning elements are preferably mounted on a common carrier which is biased to an operative position in which its positioning elements engage the main portions of cassettes in the compartment. Such positioning elements may extend into grooves which are provided in the external surfaces of the main portions.

The novel features which are considered as characteristic of the invention are set forth in particular in the appended claims. The improved magazine itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a fragmentary diagrammatic transverse vertical sectional view of a cinematographic apparatus and of a magazine which is constructed in accordance with a first embodiment of the invention;

FIG. 2 is a plan view of the structure shown in FIG. 1;

FIG. 3 is a fragmentary transverse vertical sectional view of a seocnd magazine;

FIG. 4 is a fragmentary horizontal sectional view of a third magazine; and

FIG. 5 is a fragmentary horizontal sectional view of a fourth magazine.

DESCRIPTION OF THE PREFERRED EMBODIMENTS

Referring first to FIGS. 1 and 2, there is shown a portion of the housing 2 of a motion picture projector for use with cassettes 5 containing convoluted motion picture film. Such cassettes are stacked in the elongated compartment 1F of a magazine or tray 1 which is movable lengthwise and stepwise in a channel or recess 4 extending at right angles to the optical axis of the objective 3. The magazine is of generally J-shaped cross-sectional outline and is movable stepwise in a manner not forming part of the present invention. In one of its presently preferred forms, the magazine 1 is provided with a longitudinally extending toothed rack (not shown) meshing with a pinion which is mounted in the housing 2 and can be rotated by hand or automatically to advance the magazine stepwise so as to move successive or selected cassettes 5 into a projection position in which the film which is convoluted therein can be withdrawn, its leader threaded through the projection mechanism and preferably automatically attached to a takeup reel.

Each cassette 5 comprises a casing having two preferably mirror symmetrical shells or main portions 5a, 5b which consist of synthetic plastic material and are bonded to each other in a centrally located plane 5c (indicated by dotted lines) which is parallel to the planes of the outer sides of the respective shells 5a, 5b. The casing of each cassette 5 is preferably further provided with a circumferentially extending endless groove 5d which is located in an at least nearly horizontal plane when the magazine 1 is properly mounted in the channel 4 of the housing 2. Each groove 5d has portions provided in the shells 5a and 5b of the respective casing.

As a rule, the shells 5a, 5b of each cassette 5 are made by resorting to injection molding or a similar mass-producing technique which normally cannot insure absolute indentity of all of a series of mass-produced shells. The resulting tolerances are of sufficient importance to warrant consideration in stacking of cassettes 5 in the compartment 1F of the magazine 1 because an improperly positioned cassette cannot be placed into an optimum projection position in which the leader of motion picture film therein is preferably automatically withdrawn from the casing of the cassette and is automatically threaded through the projector and attached to the takeup reel. Additional differences in dimensions develop when the shells 5a, 5b of a cassette 5 are connected to each other in the respective plane 5c. Thus, the dimensions of the shells 5a, 5b in a given cassette 5 might not be identical, and the dimensions of any given cassette need not be identical with those of another cassette or cassettes.

In accordance with a feature of the invention, the magazine 1 is provided with locating or holding means which insures proper positioning of each cassette in a stack of cassettes in the compartment 1F in such a way that, when the magazine is moved lengthwise in stepwise fashion, successive cassettes are capable of assuming a projection position with a requisite degree of accuracy. The locating or holding means comprises discrete positioning elements for each shell 5a or 5b, i.e., at least two positioning elements for each cassette 5. Furthermore, the locating or holding action of each such positioning element is preferably at least partially independent of the holding action of the other positioning elements so that each shell can be located and held in the desired position even if the dimensions of one or more shells deviate from the desired dimensions and even if the dimensions of one or more cassettes deviate from prescribed dimensions.

In the embodiment of FIGS. 1 and 2, the magazine 1 is provided with an elongated rod- or shaft-like carrier 6 for a plurality of positioning elements in the form of rotatable rollers or wheels 7 and/or fixedly mounted disks 8. As a rule, the carrier 6 will support only rollers 7 or only disks 8, but it is also within the purview of our invention to use several types of positioning elements in a single magazine. The rollers 7 and the disks 8 preferably consist, at least in part, of elastically deformable plastic or other material. The ends of the carrier 6 are connected to two arms 9 which are pivotably secured to the body of the magazine 1 by coaxial pins 9a. The arms 9 are biased in a clockwise direction, as viewed in FIG. 1, by helical springs 10 each having one end convolution connected to a post 11 on the respective arm 9 and another end convolution attached to a post 12 on the body of the magazine 1. The arrangement is such that, when the arms 9 are free to follow the bias of the springs 10, they cause the carrier 6 to assume an operative position in which the rollers 7 and the disks 8 bear against the shells 5a and 5b of cassettes 5 in the compartment 1F, preferably in such a way that a portion of each roller 7 and a portion of each disk 8 enters that part of the groove 5d in the casing of the adjacent cassette 5 which is provided in the shell 5a or 5b registering with a particular positioning element 7 or 8.

In order to further insure proper stacking of cassettes 5 in the compartment 1F of the magazine 1, the latter comprises an upstanding side wall 1A provided at its upper end with an elongated projection or rib 1a resembling a hook and extending into the grooves 5d opposite the positioning elements 7 and 8.

FIG. 2 shows that the end wall 1B of the magazine 1 carries a reciprocable plunger or pusher 14 which is biased by a helical spring 13 so as to maintain its head 14a in abutment with one outer side of the casing of the nearest cassette 5. The pusher 14 urges the entire stack of cassettes 5 upwardly, as viewed in FIG. 1, so that the foremost cassette 5 abuts against the other end wall 1D of the magazine 1. This insures that, when the magazine 1 is properly installed in the channel 4 in a starting position, the foremost cassette 5 (adjacent to the end wall 1D) automatically assumes the desired projection position or moves into such position in response to first stepwise advance of the magazine through a predetermined distance. The spring 13 insures that the outer sides of cassettes 5 in the stack of cassettes in the compartment 1F remain in abutment with each other.

The preferably elastic or partly elastic positioning elements 7, 8 cooperate with the rib 1a of the side wall 1A and with the pusher 14 to insure that each cassette 5 is capable of assuming the projection position. As mentioned above, the positioning elements 7, 8 engage discrete shells 5a or 5b and since such elements preferably consist of or comprise elastomeric material, they can readily compensate for eventual deviations of dimensions of adjacent shells 5a or 5b from preferred dimensions. The casings of cassettes 5 are held without wobbling and do not change their positions with reference to the magazine 1 while the latter moves to its starting position and thereupon advances to place successive or selected cassettes into the projection position.

FIG. 3 illustrates a portion of a modified magazine 101 having an elongated side wall or carrier 16 which supports a row of preferably elastic tongue-like flexible positioning elements 15 performing the functions of elements 7 or 8. The cassette 5 of FIG. 3 is identical with the cassettes which are shown in FIGS. 1 and 2. When a cassette 5 is properly installed in the compartment of the magazine 101, two of the tongues 15 on the carrier or wall 16 engage its shells 5a, 5b and enter the groove 5d. The tongues 15 can urge the cassette 5 of FIG. 3 against a projection such as the rib 1a shown in FIG. 1. It is clear that the side wall 16 of the magazine 101 can be replaced with the parts 6, 9, 9, 10, 10 of FIGS. 1 and 2, i.e., that the tongues 15 can be mounted on a carrier which is pivotably mounted on the magazine 101 in such a way that it urges the tongues into the grooves 5d of adjacent shells 5a or 5b. The positioning action of elastic tongues 15 is analogous to that of the rollers 7 or disks 8. The elasticity of tongues 15 suffices to compensate for eventual differences between the dimensions of shells which form part of a given cassette 5 or for differences between the dimensions of shells which form part of different cassettes.

FIG. 4 shows a portion of a third magazine 201 having an elongated side wall or carrier 18 which supports a row of elastically deformable hollow cushions 17 each of which constitutes a positioning element and can enter the groove 5d of an adjacent cassette (not shown). The wall 18 may be rigidly mounted on the body of the magazine 201 or is pivotable in the same way as the carrier 6 of FIGS. 1 and 2. The cushions 17 may be integrally connected to each other, i.e., may form parts of a continuous elongated strip of elastic material which is deformed and secured to the wall 18 at requisite intervals so as to form a row of cushions 17. It is further clear that the single strip of cushions 17 can be replaced with two or more strips each of which comprises two or more cushions and which are mounted on the wall 18 end-to-end. Since the cushions 17 are deformable, they can readily compensate for eventual differences between the dimensions of shells 5a, 5b forming part of a given cassette or of different cassettes.

The cushions 17 are hollow; however, it is equally within the scope of our invention to employ a row of solid cushions or protuberances 317 of the type shown in FIG. 5. The cushions 317 are supported by a wall or carrier 318. Also, the cushions 17 or 317 need not be provided with convex external surfaces; such surfaces may be of polygonal or other outline, as long as they can properly enter the grooves 5d or otherwise properly engage the adjacent shells 5a or 5b. It is also within the purview of the invention to employ the cushions 17 or 317 as a substitute for the rib 1a shown in FIG. 1.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims:

1. A magazine for stacks of abutting cassettes of the type serving for storage of convoluted motion picture film and including a casing comprising a plurality of main portions each having an external surface provided with a groove, said magazine defining a single elongated compartment, a stack consisting of a series of abutting cassettes located in said compartment in planes extending at right angles to the longitudinal direction of said elongated compartment, said magazine having locating means including a plurality of positioning elements each arranged to engage a different main portion of a cassette in said single elongated compartment by extending into the groove of the respective main section so that each main portion of each cassette is engaged by a discrete positioning element.

2. A magazine as defined in claim 1, wherein at least some of said positioning elements are disks.

3. A magazine as defined in claim 1, wherein at least some of said positioning elements are rollers.

4. A magazine as defined in claim 1, wherein at least some of said positioning elements are flexible tongues.

5. A magazine as defined in claim 1, wherein at least some of said positioning elements are yieldable cushions.

6. A magazine as defined in claim 1, further comprising common carrier means for said positioning elements.

7. A magazine as defined in claim 6, wherein said carrier means is movable to and from an operative position in which the positioning elements thereon engage main portions of casings of cassettes in said compartment, and further comprising means for biasing said carrier means to said operative position.

8. A magazine as defined in claim 1, wherein at least some of said positioning elements consist at least in part of elastomeric material.

9. A magazine as defined in claim 1, further comprising a projection extending into the grooves of all main portions in said compartment.

10. A magazine as defined in claim 1, further comprising spring-biased pusher means for maintaining the casings of cassettes in said compartment in abutting engagement with each other.

* * * * *